March 11, 1958 D. E. LUPFER ET AL 2,826,738
ELECTRICAL MEASURING APPARATUS
Filed March 21, 1956 4 Sheets-Sheet 1

INVENTORS
D. E. LUPFER
D. A. FLUEGEL
E. GUENTHER
BY Hudson & Young
ATTORNEYS

INVENTORS
D. E. LUPFER
D. A. FLUEGEL
E. GUENTHER
BY Hudson & Young
ATTORNEYS

March 11, 1958 D. E. LUPFER ET AL 2,826,738
ELECTRICAL MEASURING APPARATUS
Filed March 21, 1956 4 Sheets-Sheet 3

INVENTORS
D.E. LUPFER
D.A FLUEGEL
BY E. GUENTHER

Hudson & Young
ATTORNEYS

INVENTORS
D. E. LUPFER
D. A. FLUEGEL
E. GUENTHER
BY
Hudson + Young
ATTORNEYS

United States Patent Office 2,826,738
Patented Mar. 11, 1958

2,826,738

ELECTRICAL MEASURING APPARATUS

Dale E. Lupfer, Dale A. Fluegel, and Emmerich Guenther, Bartlesville, Okla., assignors to Phillips Petroleum Company, a corporation of Delaware Application March 21, 1956, Serial No. 572,925

6 Claims. (Cl. 324—61)

This invention relates to the detection and analysis of fluids in terms of the dielectric properties thereof. In another aspect it relates to a differential cell for comparing the dielectric properties of a sample fluid with those of a reference fluid.

The measurement of the dielectric properties of materials has become a valuable industrial and laboratory procedure for determining compositions. This procedure is particularly useful in analyzing fluid streams. In accordance with the present invention, an improved cell assembly is provided for use in comparing the dielectric properties of a sample fluid with those of a reference fluid. The apparatus comprises two electrical condensers which are mounted in symmetrical relationship with one another. One of the condensers has a standard reference fluid between the plates thereof. The second condenser is provided with an inlet and an outlet so that the sample fluid can be circulated through the passage between the plates. The sample fluid is first circulated through an elongated conduit that is in thermal contact with the reference fluid. In this manner, the two fluids are compared at a common temperature.

Accordingly, it is an object of this invention to provide improved apparatus for detecting and analyzing fluids in terms of the dielectric properties thereof.

Another object is to provide a differential cell assembly for use in comparing the dielectric properties of a sample fluid with those of a reference fluid.

Other objects, advantages and features of the invention should become apparent from the following detailed description taken in conjunction with the accompanying drawing in which.

Figure 1:
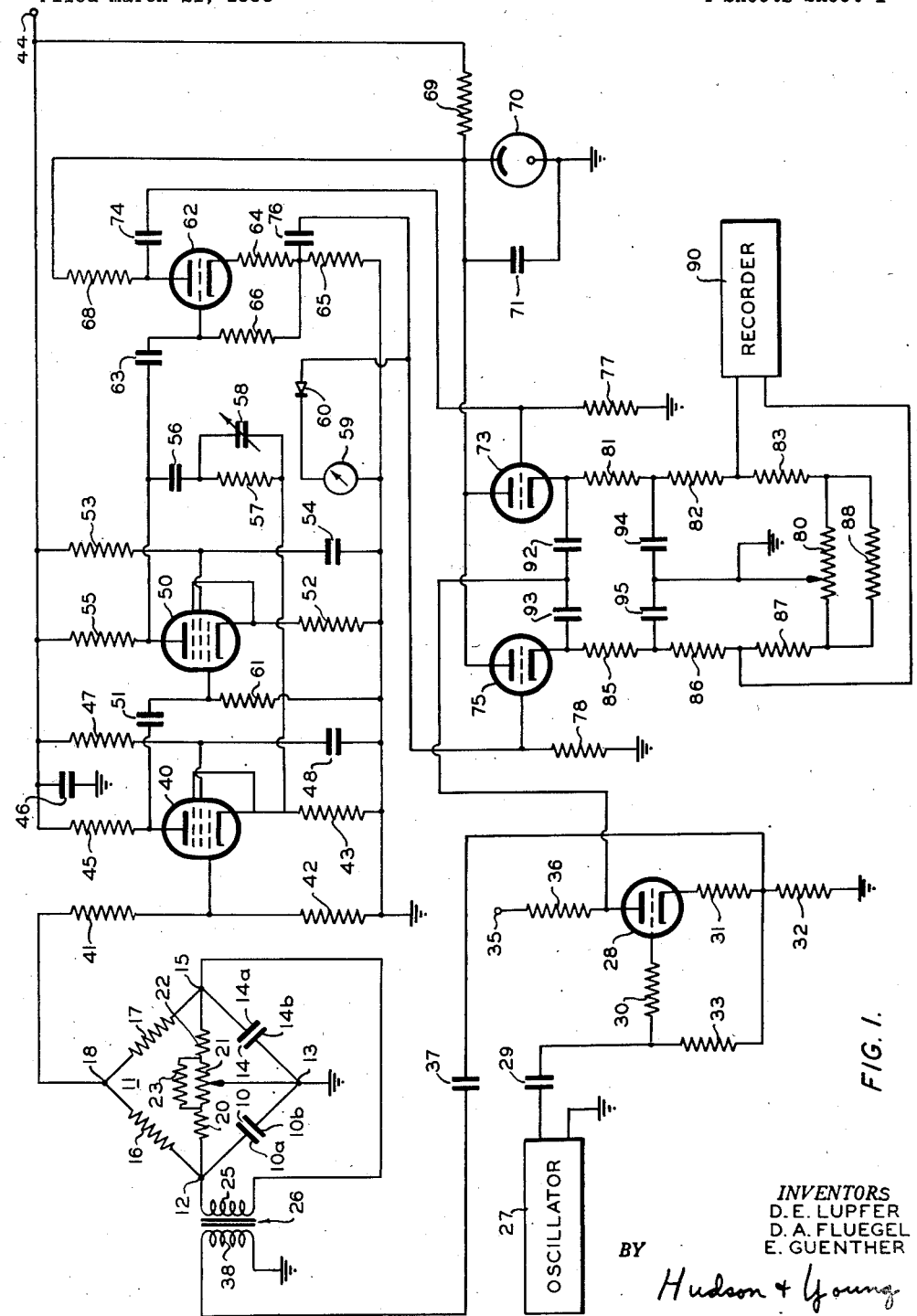
Figure 1 is a schematic circuit diagram of measuring apparatus employed in conjunction with the cell assembly of this invention.
Figure 2:
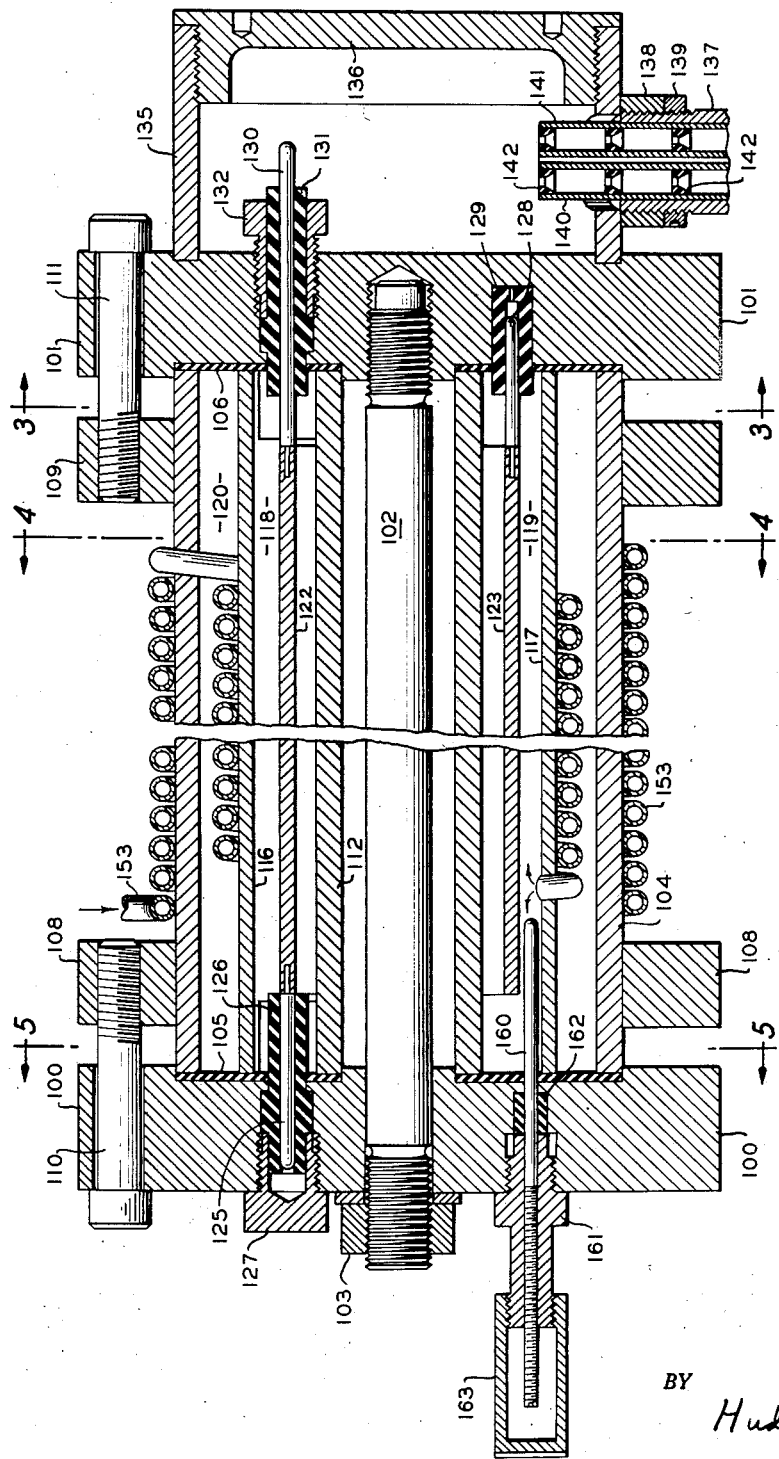
Figure 2 is a detailed sectional view of the differential cell assembly.
Figure 3:
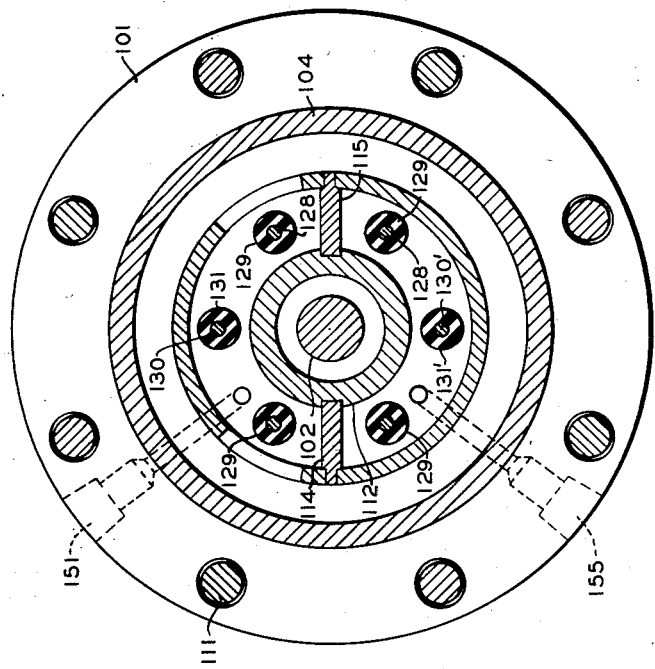
Figure 3 is a sectional view taken along line 3—3 in Figure 2.
Figure 5:
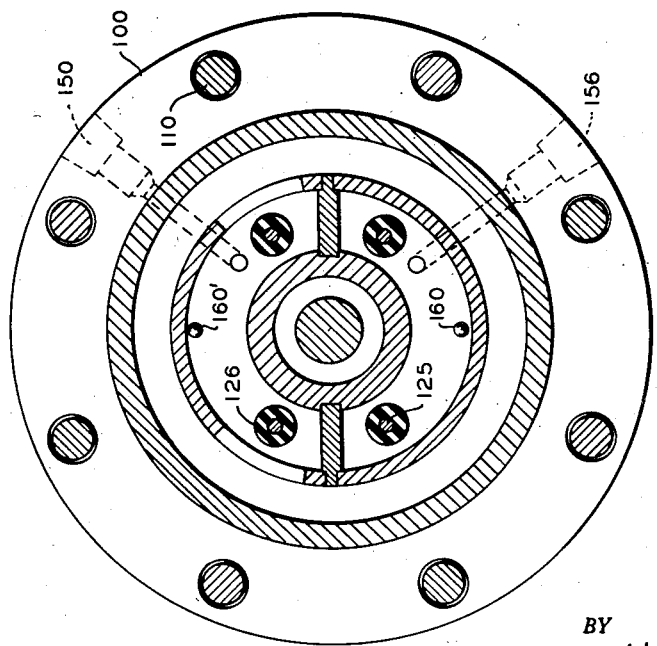
Figure 5 is a sectional view taken along line 5—5 in Figure 2.
Figure 4:
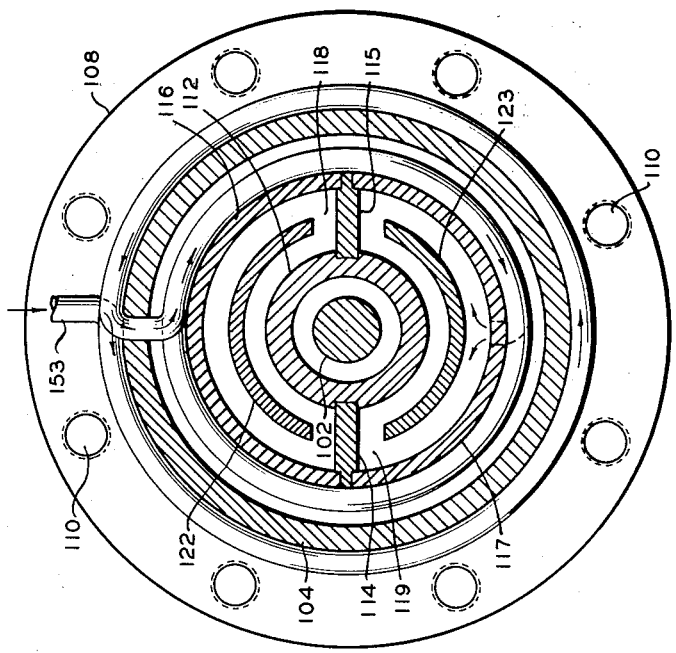
Figure 4 is a sectional view taken along line 4—4 in Figure 2.

Referring now to the drawing in detail and to Figure 1 in particular, there are shown a pair of capacitors 10 and 14 which form the two elements of the differential cell of this invention. Capacitor 10 is adapted to have a sample fluid to be tested positioned between the spaced plates 10a and 10b. Capacitor 14 is adapted to have a reference fluid positioned between the spaced plates 14a and 14b. These two capacitors are connected in a bridge network 11. Capacitor plates 10b and 14b are connected to one another and to ground. Capacitor plates 10a and 14a are connected to respective bridge terminals 12 and 15. Resistors 16 and 17 are connected in series relationship between terminals 12 and 15. The junction between these resistors is designated as terminal 18. A resistor 20, a potentiometer 21 and a resistor 22 are connected in series relationship between terminals 12 and 15. A resistor 23 is connected in parallel with potentiometer 21. The contactor of potentiometer 21 is connected to grounded bridge terminal 13. Bridge terminals 12 and 15 are connected to the respective end terminals of the secondary winding 25 of a transformer 26.

Transformer 26 is energized from the output of an oscillator 27. The first output terminal of oscillator 27 is connected to the control grid of a triode 28 through a capacitor 29 and a resistor 30, which are connected in series relationship. The cathode of triode 28 is connected to ground through series connected resistors 31 and 32. The junction between resistor 30 and capacitor 29 is connected to the junction between resistors 31 and 32 by a resistor 33. The anode of triode 28 is connected to a positive potential terminal 35 through a resistor 36. The junction between resistors 31 and 32 is connected through a capacitor 37 to one terminal of the primary winding 38 of transformer 26. The second terminal of transformer winding 38 is connected to ground.

Output terminal 18 of bridge network 11 is connected to the control grid of a pentode 40 through a resistor 41. The control grid of pentode 40 is connected to ground through a resistor 42. The cathode and suppressor grid of pentode 40 are connected to ground through a resistor 43. The anode of pentode 40 is connected to a positive potential terminal 44 through a resistor 45. A capacitor 46 is connected between terminal 44 and ground. The screen grid of pentode 40 is connected to terminal 44 through a resistor 47 and to ground through a capacitor 48. The anode of pentode 40 is also connected to the control grid of a pentode 50 through a capacitor 51. A resistor 61 is connected between the control grid of pentode 50 and ground. The cathode and suppressor grid of pentode 50 are connected to ground through a resistor 52. The screen grid of pentode 50 is connected to terminal 44 through a resistor 53 and to ground through a capacitor 54. The anode of pentode 50 is connected to terminal 44 through a resistor 55.

The anode of pentode 50 is also connected to the cathode of pentode 40 through a feedback network which comprises a capacitor 56 and a resistor 57 which are connected in series relationship. A variable capacitor 58 is connected in parallel with resistor 57 to change the phase of the feedback signal.

The anode of pentode 50 is connected to the control grid of a triode 62 through a capacitor 63. The cathode of triode 62 is connected to ground through series connected resistors 64 and 65. The control grid of triode 62 is connected to ground through series connected resistors 66 and 65. The anode of triode 62 is connected to terminal 44 through series connected resistors 68 and 69. A voltage regulating tube 70 is connected between ground and the junction between resistors 68 and 69, and a capacitor 71 is connected in parallel with this tube.

The anode of triode 62 is also connected to the control grid of a triode 73 through a capacitor 74. The junction between resistors 64 and 65 is connected to the control grid of a triode 75 through a capacitor 76. The control grids of triodes 73 and 75 are connected to ground through respective resistors 77 and 78. A null detecting meter 59 is connected between ground and the grid of triode 75 through rectifier 60. The anodes of triodes 73 and 75 are connected to one another and to terminal 44 through resistor 69. The cathode of triode 73 is connected to the first end terminal of a potentiometer 80 through series connected resistors 81, 82 and 83. The cathode of triode 75 is connected to the second end terminal of potentiometer 80 through series connected resistors 85, 86 and 87. The contactor of potentiometer 80 is connected to ground. A resistor 88 is connected in parallel with potentiometer 80. The junction between resistors 82 and 83 is connected to the first input terminal of a recorder 90, and the junction between resistors 86 and 87 is connected to the second input terminal of recorder 90. The anode of triode 28 is connected to the cathodes of triodes 73 and 75 through respective capacitors 92 and 93. A capacitor 94 is connected between ground and the junction between resistors 81 and 82, and a capacitor 95 is connected between ground and the junction between resistors 85 and 86.

The operation of the apparatus of Figure 1 will now be described. The output of oscillator 27 is applied through cathode follower 28 and transformer 26 across terminals 12 and 15 of bridge network 11. It should be evident that this network forms a capacity bridge. If the bridge is balanced there is a zero potential difference between terminals 13 and 18. However, any unbalance of the bridge due to a change in capacitance of element 10 results in the potential at terminal 18 changing from ground potential. Also, any unbalance in the resistance arm including resistors 20, 21, 22 and 23 or any change in the loss factor of the material in condenser 10 results in the potential at terminal 18 changing from ground potential. This latter potential is 90° out of phase with the potential due to a change in capacity of condenser 10. This potential is applied to the grid of pentode 49. Any unbalance signal is amplified by pentodes 49 and 50 and applied to the control grid of triode 62. Triode 62 provides two output signals which are 180° out of phase with one another. These two signals are applied to the control grids of triodes 73 and 75, respectively. Triodes 73 and 75 and the associated circuit form a phase sensitive detector. A reference signal is applied to the cathodes of these tubes from the output of triode 28. The two signals applied to the phase detector network are thus of the same frequency because they are both obtained from oscillator 27. The currents through the two triodes are functions of the amplitudes of the signals applied to the control grids and the phases of these signals with respect to the reference signal applied to the cathodes. The resistors and capacitors in the cathode circuits of the two triodes filter the currents through the triodes. If the capacitance of capacitor 10 should become greater than that of capacitor 14, bridge network 11 is unbalanced in a first direction. If the capacitance of capacitor 10 becomes less than that of capacitor 14 the bridge is unbalanced in the opposite direction. The phase of the output signal from the bridge thus changes by 180° when the direction of the unbalance changes.

Bridge network 11 is balanced initially by varying capacitor 14 and potentiometer 21 until the recorder reads zero, or a predetermined value as determined by the setting of the contactor of potentiometer 80, when a reference material is disposed between the plates of capacitor 10. The contactor of potentiometer 21 alone is then moved to determine if the signal applied to recorder 90 changes. If a change is observed, capacitor 58 is varied to change the phase of the signal applied to the control grid of triode 62. Adjustment of capacitor 58 is continued to restore the recorder to the initial value. The contactor of potentiometer 21 is then adjusted until the reading of meter 59 is zero, which indicates that there is a zero potential difference between bridge terminals 13 and 18. At this final point, any further change of the position of the contactor of potentiometer 21 does not change the recorder reading. The bridge circuit is then balanced and the apparatus is ready to be operated. Any change in capacitance of capacitor 10 results in a change in the signal applied to recorder 90. If desired, this signal can be employed to operate suitable control equipment to adjust a process variable so that the material being tested retains a desired dielectric constant.

The differential cell assembly of capacitors 10 and 14 is illustrated in Figures 2, 3, 4 and 5. This assembly comprises first and second spaced end plates 100 and 101. A central rod 102 is threaded at one end into plate 101. The second end of rod 102 extends through an opening in plate 100 and is engaged by a nut 103. Rod 102 thus maintains plates 100 and 101 in spaced relationship with one another. An outer cylindrical plate 104 is disposed between end plates 100 and 101. Annular gaskets 105 and 106 are positioned between the ends of plate 104 and respective end plates 100 and 101. Flanges 108 and 109 are welded to plate 104 adjacent the ends thereof. Screws 110 and 111 secure flanges 108 and 109 to respective end plates 100 and 101. An inner cylindrical plate 112 surrounds rod 102 and extends between end plates 100 and 101. Flat plates 114 and 115, see Figure 3, extend radially outwardly from cylindrical plate 112 to divide the exterior thereof into two regions. Semicircular plates 116 and 117 engage the outer edges of plates 114 and 115 to define two fluid chambers 118 and 119. An annular chamber 120 is formed between cylindrical plate 104 and the cylinder formed by plates 116 and 117.

Curved plates 122 and 123, which correspond to respective capacitor plates 10a and 14a of Figure 1, are mounted in respective chambers 118 and 119 in spaced relationship with plates 112, 114, 115, 116, 117, 100 and 101. These plates are retained in the illustrated position by a plurality of support pins 125 which extend into respective bushings 126 in end plate 100. Bushings 126 are secured in plate 100 by means of packing nuts 127. The second ends of plates 122 and 123 are attached to support pins 128 which extend into bushings 129 in end plate 101. Connecting pins 130 and 130' extend from plates 122 and 123 through respective bushings 131 and 131' in end plate 101. These bushings are retained in position by packing nuts 132. The ends of pins 130 and 130' are adapted to be attached to electrical leads, not shown, which connect these two pins to respective terminals 12 and 15 of bridge network 11.

An electrical terminal housing 135 is attached to end plate 101. A cap 136 is threaded to housing 135. An electrical lead housing 137 is threaded to a flange 138 which is attached to housing 135. A lock ring 139 retains housing 137 in position. Conduits 140 and 141 extend through housing 137. These conduits are provided with a plurality of spacers 142 which retain the electrical leads, not shown, in rigid positions. This prevents movement of the electrical leads relative to the grounded housing. Any movement of the leads relative to the housing may result in a change in the indicated capacitance of the cell assembly. Conduits 140 and 141 also function as electrostatic shields.

Chambers 118 and 120 are normally filled with a reference liquid. This reference fluid can be introduced into the chambers through passages 150 and 151 which are drilled in respective end plates 100 and 101, see Figures 3 and 5. The inner ends of passages 150 and 151 extend into chamber 118. The sample fluid to be measured is introduced into the cell assembly through a conduit 153 which is coiled about cylindrical plate 104. Conduit 153 makes thermal contact with plate 104 so that the fluids in conduit 153 and chamber 120 tend to acquire the same temperature. Conduit 153 extends from the region exterior of plate 104, through the plate, and is coiled about plates 116 and 117. This arrangement provides further heat exchange between the two fluids. The end of conduit 153 terminates in chamber 119 to introduce the sample fluid therein. The sample fluid is vented from chamber 119 through a passage 155, see Figure 3, which is drilled in end plate 101. The sample fluid circulates through chamber 119 on both sides of plate 123. A passage 156 is drilled in end plate 100, see Figure 5, to communicate with chamber 119 so that the sample chamber can be flushed out if desired.

A metal rod 160 is threaded through a packing nut 161 in end plate 100. A packing ring 162 prevents leakage of fluid past rod 160. A cap 163 covers the end of rod 160 to prevent accidental movement thereof. The distance rod 160 extends into chamber 119 can be varied by rotation of the rod in packing nut 161. A similar rod 160' extends into chamber 118. The purpose of rod 160 is to vary the effective capacitance of the element 14 which is formed by plate 123 and grounded plates 112, 115, 114 and 117. The rod is grounded by plate 100 so that insertion thereof between plates 123 and 117 increases the capacitance of the unit. Rod 160' serves to adjust the capacitance of the element 10 which is formed by plate 122 and grounded plates 112, 114, 115 and 116.

Figure 6:
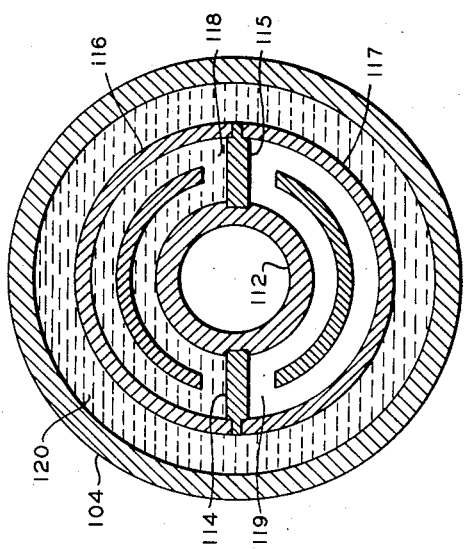
Figure 6 is a schematic cross-sectional view of the cell assembly illustrating the fluid filled chambers.

From an inspection of Figure 6 it can readily be seen that chamber 119 represents the region through which the sample fluid is circulated. If desired, a reference fluid can be circulated through chamber 118 by means of passages 150 and 151.

From the foregoing description, it can be seen that there is provided, in accordance with this invention, a compact differential cell assembly which can be employed to advantage to compare the dielectric properties of two fluids. The two capacitor elements are symmetrical so that any temperature variation tends to effect both elements in like manner. The elongated conduit 153 provides efficient heat exchange between the two fluids so that the fluids being compared are at the same temperature. In some operations it is necessary to maintain the entire assembly at elevated temperatures to ensure a free circulation of fluids. This can be accomplished by positioning the assembly in a housing through which steam is circulated. In normal operation the assembly is positioned so that end plate 100 forms the base and end plate 101 forms the top plate.

While the invention has been described in conjunction with a present preferred embodiment, it should be evident that it is not limited thereto.

What is claimed is:

1. Apparatus for comparing the dielectric properties of a sample fluid with those of a reference fluid comprising a first generally cylindrical plate, a second generally cylindrical plate concentric with and enclosing said first plate in spaced relationship therewith, sealing means extending between adjacent ends of said first and second plates, third and fourth plates extending from said first plate in generally radial directions outwardly to said second plate, said third and fourth plates being spaced from one another to divide the region between said first and second plates into first and second chambers, means to circulate a sample fluid through said first chamber, a fifth curved plate positioned in said first chamber and spaced from said first, second, third and fourth plates, and a sixth curved plate positioned in said second chamber and spaced from said first, second, third and fourth plates.

2. The combination in accordance with claim 1 further comprising a seventh generally cylindrical plate concentric with and enclosing said second plate, and means extending between adjacent ends of said second and seventh plates to form a third chamber between said second and seventh plates; and wherein said means to circulate fluid comprises a conduit communicating at one end with said first chamber and extending therefrom in an elongated path through said third chamber and about said seventh plate in thermal contact therewith, and a fluid outlet in said first chamber.

3. The combination in accordance with claim 2 further comprising a first rod, means mounting said first rod so that said first rod can be adjustably inserted into said first chamber between said fifth plate and one of said first and second plates, a second rod, and means mounting said second rod so that said second rod can be adjustably inserted into said second chamber between said sixth plate and one of said first and second plates.

4. Apparatus for comparing the dielectric properties of a sample fluid with those of a reference fluid comprising first and second flat plates, means positioning said flat plates in facing spaced relationship, a first cylindrical plate extending between said flat plates, a second larger cylindrical plate enclosing said first cylindrical plate and extending between said flat plates, said first and second cylindrical plates having a common axis and being spaced from one another, a third flat plate extending radially from said first cylindrical plate to said second cylindrical plate between said first and second flat plates, a fourth flat plate extending radially from said first cylindrical plate to said second cylindrical plate between said first and second flat plates, said third and fourth flat plates lying in substantially the same plane on opposite sides of said first cylindrical plate, a third cylindrical plate of diameter larger than the diameter of said second cylindrical plate, said third cylindrical plate enclosing said second cylindrical plate in spaced relationship therewith and extending between said first and second flat plates, a first curved plate positioned between said first and second cylindrical plates, a second curved plate positioned between said first and second cylindrical plates on the opposite side of said third and fourth flat plate from said first curved plates, said curved plates being spaced from said flat plates and said first and second cylindrical plates, a first electrode attached to said first curved plate and extending through one of said first and second flat plates, means to insulate said first electrode from the plate through which it extends, a second electrode attached to and extending through one of said first and second flat plates, and means to insulate said second electrode from the plate through which it extends.

5. The combination in accordance with claim 4 further comprising a conduit extending from a region exterior of said third cylindrical plate around and in contact with said third cylindrical plate a plurality of times, around said second cylindrical plate a plurality of times, and into one of the regions between said first and second cylindrical plates; and a fluid drain communicating with said one region.

6. The combination in accordance with claim 4 further comprising support means to retain electrical conductors which are adapted to be connected to said electrodes rigid with respect to said plates.

References Cited in the file of this patent

UNITED STATES PATENTS

| | | |
|---|---|---|
| 2,485,579 | Elliott | Oct. 25, 1949 |
| 2,599,583 | Robinson et al. | June 10, 1952 |